United States Patent
King

[15] 3,668,449
[45] June 6, 1972

[54] ALUMINUM CLAD COPPER COMMUTATOR FOR USE WITH ALUMINUM ARMATURE WIRE

[72] Inventor: John B. King, Alton, Ill.
[73] Assignee: Olin Corporation
[22] Filed: Oct. 13, 1970
[21] Appl. No.: 80,346

[52] U.S. Cl............................310/236, 310/233, 29/597
[51] Int. Cl................................................H02k 13/04
[58] Field of Search.................................310/233–237; 29/597, 472.3

[56] References Cited

UNITED STATES PATENTS

| | | |
|---|---|---|
| 499,350 | 6/1893 | Parshall............................310/236 |
| 3,244,917 | 4/1966 | Gute.................................310/237 X |
| 1,922,317 | 8/1933 | Mudge...................................310/236 |
| 3,381,366 | 5/1968 | Winter.................................29/472.3 |
| 3,538,365 | 11/1970 | Reisnecker...........................310/237 |
| 3,478,421 | 11/1969 | Preece..............................210/237 X |
| 2,436,910 | 3/1948 | Werner.................................310/236 |

Primary Examiner—James D. Trammell
Assistant Examiner—Mark O. Budd
Attorney—Robert H. Bachman and Gordon G. Menzies

[57] ABSTRACT

A new and improved electrical commutator comprising a plurality of spaced apart plates wherein said plates have at least one outwardly projecting finger for holding an armature wire and wherein the plates are copper and the finger is copper integrally bonded to a side of aluminum.

9 Claims, 5 Drawing Figures

PATENTED JUN 6 1972

3,668,449

INVENTOR:
JOHN B. KING

BY Gordon G. Menzies

AGENT

ALUMINUM CLAD COPPER COMMUTATOR FOR USE WITH ALUMINUM ARMATURE WIRE

The present invention relates to a new and improved electrical commutator. More particularly, the present invention relates to a novel alloy composite having increased strength and weldability, as well as good formability and wearing characteristics.

At present many electrical devices such as commutators comprise copper or an alloy of solid copper, such as silver bearing oxygen free high conductivity copper, deoxidized low phosphorus copper, or low oxygen silver bearing copper.

The aforementioned materials are employed since in forming the hooks, or fingers, of the commutator severe deformation is required and these materials more easily deform without cracking since they are essentially free of oxide stringers.

Other properties which are important in the commutator art however, in addition to electrical conductivity, are wearability, formability, weldability, and strength.

Wearability is important since the motor brushes ride on the commutator surface and thereby a commutator surface is required which will insure good wearability of the brushes. Also, since it is essential that the commutator fingers do not break away during operation, suitable strength characteristics are required of the material employed.

Naturally, also, the material to be employed must possess good weldability since the fingers of the commutator are bent over and then resistance welded to the magnet wire after winding of the armature.

The armature wire employed is of copper and is welded to the armature in order to effect the required electrical connection.

It is known, however, that aluminum has good electrical conductivity properties but cannot be suitably employed as armature wire wherein the wire is welded to a copper commutator due to the formation of deleterious compounds at the weld temperature.

Further, an aluminum commutator has the disadvantage of causing rapid wearing of the brushes contacting the commutator due to the formation of abrasive oxides of aluminum.

It is therefore desireable to provide a commutator wherein aluminum armature wire may be advantageously employed with attendant cost savings.

It is therefore a principle object of the present invention to provide a new and improved commutator.

It is still a further object of the present invention to provide a commutator as aforesaid whereby the article is characterized by having improved weldability as well as good wearability and formability.

In accordance with the present invention, it has now been found that the foregoing objects and advantages may be readily obtained.

The present invention overcomes the disadvantages of the art and is a simple, convenient and highly useful article.

The present invention is an electrical commutator comprising a plurality of spaced apart copper or high conductivity copper alloy plates electrically insulated from each other wherein the plates have at least one outwardly projecting finger for holding an armature wire, and further wherein the fingers are a composite comprising commercial purity aluminum, such as A.A. 1100 or E.C. grade aluminum, integrally bonded to copper or a high conductivity copper alloy. The aforementioned plates are positioned about a suitable bushing, such as a plastic, with the aluminum component facing outwardly. Low Oxygen Electrolytic Tough Pitch Copper, Electrolytic Tough Pitch Copper, or Oxygen Free High Conductivity Copper is the preferred copper.

The process of the present invention comprises integrally bonding copper or a high conductivity copper alloy, and preferably Low Oxygen Electrolytic Tough Pitch Copper, Electrolytic Tough Pitch Copper, or Oxygen Free High Conductivity Copper, to aluminum to form a composite sheet, forming fingers on an edge of the composite sheet, with the fingers parallel to the composite sheet and then forming the composite into a cylinder so that the aluminum is the outermost component. The cylinder is then mounted about a bushing, the fingers bent so as to catch and hold an armature wire, and the cylinder then broached between the fingers to form a plurality of spaced apart plates. The aluminum is then removed as for example by machining, from the outside surface of the cylinder which contacts the motor brushes.

Preferably, but not necessarily, the aforementioned bonding of the composite should be in accordance with the method of U.S. Pat. No. 3,381,366 which teaches convenient methods for producing composite metal articles. For example, U.S. Pat. No. 3,381,366 teaches a method for preparing an aluminum base alloy core composite. It is difficult to produce a composite article having an aluminum core or cladding due to the formation of both adherent and flaky oxides at moderate or elevated temperatures necessary for hot rolling. This oxide layer frequently tends to break open during hot rolling but still can and often does cause severe problems. Briefly, the process described in the aforementioned U.S. Pat. No. 3,381,366 provides for heating the core of a thickness less than 0.50 inch, to a temperature between 150° and 1,050° F rolling together said core and cladding at a speed of at least 25 ft. per minute in one pass at a reduction range between 35 to 80 percent with said core and cladding coming together for the first time in the bite of the rolls, said cladding of a thickness less than 0.250 inch and contacting the roll prior to contacting of the core. It is necessary that the included angle between the core and the cladding is in excess of 5° upon entering the rolls, with the preferred angle in excess of 10°. An angle in excess of 10° will insure that the cladding and the core do not come together earlier than in the bite of the rolls.

Upon entering the rolls, the cladding and the rolls are traveling at different linear speeds whereas upon exiting from the rolls they are going at the same speed due to reduction in thickness of the composite. The difference in traveling speeds between the rolls and the cladding in combination with the precontacting of the cladding and the rolls generates a shear strain and introduces shearing at the bite of the rolls and the core cladding interface. The shearing strain at this interface results in turbulent material flow thereby causing more intimate bonding by increasing the interfacial linear surface of the composite by at least 20 percent. It is further noted that the interfacial surface between the core and cladding is characterized by the absence of interatomic diffusion, which may result in the formation of brittle compounds, between the core and cladding material.

Naturally, other methods of bonding may also be employed.

After forming the composite, an edge of the composite is blanked to form fingers extending parallel with respect to the composite sheet. The composite is then further formed into a cylinder as, for example, by forming about a mandrel in a press, the cylinder is the mounted on a suitable bushing, and then the fingers are bent upwardly from the cylinder to catch and hold an armature wire. The cylinder is then broached between the fingers to form a plurality of spaced apart plates. Generally each plate has at least one finger, and normally a single finger.

Figure 1:
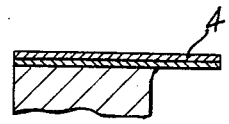
FIG. 1 is a partial sectional view of the commutator before machining.

FIG. 1 shows the commutator 2 of the present invention after forming of the composite cylinder and before bending of the finger 4 into position to catch and hold an armature wire and machining away of the aluminum.

Figure 2:
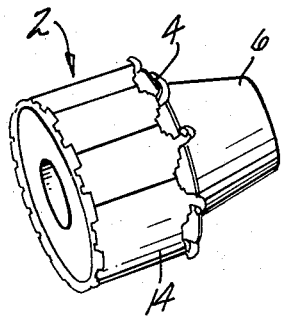
FIG. 2 is a perspective view of the commutator after bending of the fingers to catch and hold an armature wire.
Figure 3:
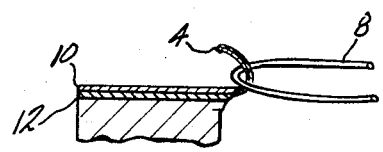
FIG. 3 is a partial sectional view of the commutator after the finger is wound about with an armature wire.

FIG. 2 shows the commutator 2 of the present invention after mounting on a bushing 6 before winding with the armature wire 8. The fingers 4 are shown in the upright position after bending and circumferentially spaced apart to form hooks to catching and holding the armature wire during winding, as shown in FIG. 3.

Figure 5:
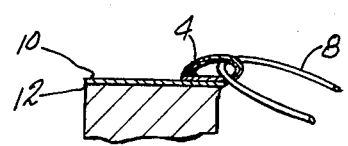
FIG. 5 is a partial sectional view of the commutator taken through line 5—5 of FIG. 4.

During installation with an armature, after winding the wire about finger 4 the finger is then further bent and welded to the magnet wire and the aluminum 10 machined away, as shown in FIG. 5.

The relatively high strength of the copper component 12 imparts increased strength to the fingers of the commutator plates 14 of the commutator 2. This is important since the high strength insures that the fingers 4 will not yield when the aramture 12 is wound, i.e., when the armature wire 8 is hooked around the projecting fingers for should yielding occur the fingers 4 would require rebending; or failure may later occur in service due to a poor joint where the fingers are resistance welded to the aluminum armature wire 8.

Figure 4:
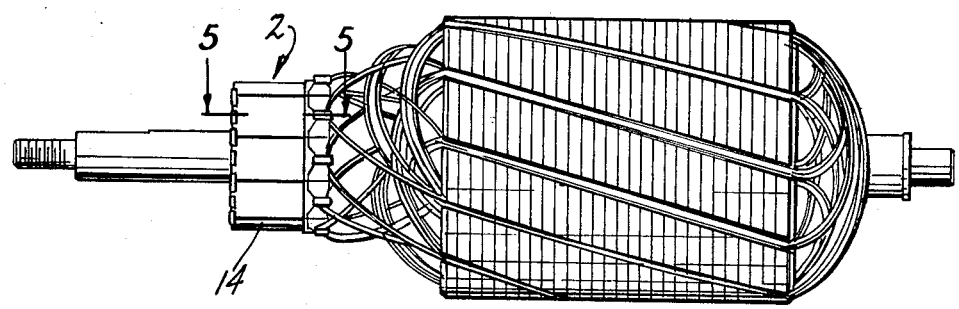
FIG. 4 is a side view of the commutator after installation with the armature, and machining away of the aluminum component upon which the bushes ride.

In addition weldability is very important since the fingers 4 of the commutator must be welded to the armature wire 8 after the aforementioned winding and after they are bent over the wire, as shown in FIGS. 4 and 5.

Therefore, in accordance with the present invention the copper component is a Low Oxygen Electrolytic Tough Pitch Copper of 99.90 percent minimum copper and 0.02 percent oxygen maximum, or Electrolytic Tough Pitch Copper of at least 99.90 percent copper and 0.04 nominal oxygen. Oxygen Free High Conductive Copper of at least 99.95 percent copper may also be readily employed.

The aluminum component may be any suitable grade of aluminum of the required current carrying capacity, and is preferably A.A. 1100 aluminum of E.C. grade of at least 99.45 percent purity.

Generally, but not necessarily the thickness of the article after bonding together to form a composite article and before the aforementioned machining ranges from 0.030 to 0.060 inches in thickness with the aluminum component comprising from about 5.0 to 20.0 percent of the thickness of the article, and preferably about 10.0 percent, with the copper as the remainder.

The present invention is thus an electrical commutator having improved weldability and strength as well as excellent machinability, formability and wear properties, and a method of producing the commutator.

The present invention will be more readily apparent from the following illustrative example.

EXAMPLE

E.C. grade aluminum was clad on one side of Low Oxygen Tough Pitch Copper to form an integrally bonded composite. The composite was then cold rolled to about 0.050 inches then annealed to effect recrystallization in both the aluminum and copper alloy components. The fingers were then blanked out of an edge of the composite strip or sheet and the strip was then formed into a hollow commutator blank of 7/8 inch diameter with a 5/16 inch contact surface. The blank was then filled with a plastic and then tumbled to remove any excess plastic material. The fingers, each about three-sixteenths inch long as measured from its base when in the flat condition and about one-sixteenth inch wide, were then bent to catch and hold an armature wire. After bending of the fingers the article was then broached to form the commutator bars of about one-fourth inch wide, the article was then assembled with an armature and then the aluminum from the contacting surface of the brushes machined away. The article was found to have improved weldability and formability, as well as high strength, during the assembly operation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An electrical commutator comprising: a plurality of plates mounted in a cylindrical fashion about a bushing, said plates being spaced apart and electrically insulated one from the other, said plates having means for bonding to an aluminum armature wire integral therewith comprising at least one outwardly projecting finger from an edge of said plate, said plates comprising a material selected from the group consisting of copper and high conductivity copper alloys and said finger being a composite comprising a base of said material integrally bonded to a cladding of aluminum with said aluminum facing outwardly with respect to said bushing when said finger is substantially horizontal to the outside surface of said bushing before bending and welding of the finger to the armature wire.

2. An electrical commutator in accordance with claim 1 wherein said copper is selected from the group consisting of L Oxygen Electrolytic Tough Pitch Copper, Electrolytic Tough Pitch Copper, and Oxygen Free High Conductivity Copper.

3. An electrical commutator in accordance with claim 2 wherein said aluminum is selected from the group consisting of A.A. 1100 E.C. grade aluminum.

4. An electrical commutator in accordance with claim 2 wherein said fingers project towards the opposing edges of said plates and substantially parallel the faces thereof.

5. An electrical commutator in accordance with claim 4 further including an armature wire positioned between said fingers and said faces and resistance welded to said fingers and said plates.

6. An electrical commutator in accordance with claim 2 wherein each of said plates has a single outwardly extending finger.

7. An electrical commutator in accordance with claim 6 wherein said composite is from 0.030 to 0.060 inches thick and wherein said aluminum and said plate is from 5 to 30 percent of the thickness and said finger.

8. An electrical commutator in accordance with claim 7 wherein said aluminum is about 10 percent of the thickness of said finger.

9. An electrical commutator in accordance with claim 5 wherein said copper contains as impurities 0.2 maximum oxygen, 0.03 percent maximum zinc, total all other impurities less than 0.03 percent nominal.

* * * * *

UNITED STATES PATENT OFFICE
CERTIFICATE OF CORRECTION

Patent No. 3,668,449          Dated June 6, 1972

Inventor(s) John B. King

It is certified that error appears in the above-identified patent and that said Letters Patent are hereby corrected as shown below:

Column 4, line 33, after "of" insert -- Low --

Column 4, line 38, after "1100" insert -- and --

Signed and sealed this 3rd day of October 1972.

(SEAL)
Attest:

EDWARD M. FLETCHER, JR.
Attesting Officer

ROBERT GOTTSCHALK
Commissioner of Patents